US010621892B2

(12) United States Patent
Rigal

(10) Patent No.: US 10,621,892 B2
(45) Date of Patent: Apr. 14, 2020

(54) SYSTEM AND METHOD FOR CONTROLLING AMOUNT OF LIGHT EMITTING FROM ILLUMINATING SCREEN

(71) Applicant: R.C.P. Regal Co-Production LTD, Bet Shemesh (IL)

(72) Inventor: Israel Rigal, Bet Shemesh (IL)

(73) Assignee: R.C.P. REGAL CO-PRODUCTION LTD, Bet Shemesh (IL)

( * ) Notice: Subject to any disclaimer, the term of this patent is extended or adjusted under 35 U.S.C. 154(b) by 128 days.

(21) Appl. No.: 16/101,545

(22) Filed: Aug. 13, 2018

(65) Prior Publication Data
US 2020/0051467 A1 Feb. 13, 2020

(51) Int. Cl.
| | |
|---|---|
| *G06T 19/00* | (2011.01) |
| *G09F 9/30* | (2006.01) |
| *F21V 8/00* | (2006.01) |
| *H05B 47/10* | (2020.01) |
| *H05B 45/10* | (2020.01) |

(52) U.S. Cl.
CPC ............ *G09F 9/30* (2013.01); *G02B 6/0031* (2013.01); *H05B 47/10* (2020.01); *G02B 6/0066* (2013.01); *H05B 45/10* (2020.01)

(58) Field of Classification Search
None
See application file for complete search history.

(56) References Cited

U.S. PATENT DOCUMENTS

| | | | | |
|---|---|---|---|---|
| 2012/0235891 | A1* | 9/2012 | Nishitani | G02B 3/0056 345/102 |
| 2016/0292917 | A1* | 10/2016 | Dorner | G03B 21/2053 |
| 2019/0197967 | A1* | 6/2019 | Moriyama | B60K 35/00 |

* cited by examiner

*Primary Examiner* — Elmito Breval
(74) *Attorney, Agent, or Firm* — Soroker Agmon Nordman

(57) ABSTRACT

A system and method for controlling amount of light emitting from an illuminating screen including: a frame defining a space, a screen mounted onto a front side of said frame, a back plate mounted onto a back side of the frame, opposite the front side, at least one light source and a concealing element. The at least one light source is positioned within the space defined by the frame and is configured to illuminate the screen. The concealing element is located inside the space defined by the frame and is configured to block light from illuminating the screen. The amount of light emitting through the screen is controlled by a ratio between the area of the concealing element positioned in a section located between the at least one light source and the screen, and the total area of the section.

20 Claims, 11 Drawing Sheets

SYSTEM AND METHOD FOR CONTROLLING AMOUNT OF LIGHT EMITTING FROM ILLUMINATING SCREEN

TECHNICAL FIELD

The present disclosure generally relates to an illuminating screen, and more specifically to an illuminating screen including a mechanism to control the amount of light emitting through the screen.

BACKGROUND

Illuminating apparatuses have many structural forms and various lighting degrees. Some illumination apparatuses comprise several small illumination sources and/or one long light source, such as neon light sources, to create an illuminating lamp. However, none of these lamps are in the form of a hanging picture, which further provides means to control the amount of light emitting from these lamps.

SUMMARY

According to an aspect of some embodiments of the present disclosure, there is provided a system for controlling amount of light emitting from an illuminating screen, the system may include: a frame, which may include at least one light source, may be positioned on an interior side of the frame, a screen, which may be mounted onto a front side of the frame, a back plate, which may be mounted onto a back side of the frame, opposite the front side, and a conveyer belt, which may be located inside a first space defined by the frame and located between the back plate and the screen, the belt may include a transparent portion and an opaque portion. The belt may be stretched between at least two wheels such that an interior side of the belt rotates around the at least two wheels, thereby defining a second space between the at least two wheels and the interior side of the belt. The at least one light source may illuminate the second space, whereby a section of the belt may positioned between the light source and a light guide, such that the amount of light emitting through the screen is controlled by determining a ratio between the transparent portion and the opaque portion positioned in the section.

Optionally, the system may be in the form of a hanging picture.

Optionally, the system further comprising an image, which may be fastened onto a side of the screen, such that light may emit through the screen and the image.

Optionally, the image may be a visible representation such as a picture, an engraving, a slide, a clock, any other visual representation or any combination thereof.

Optionally, the belt of the system further comprising a protruding element protruding from the frame, the screen, the back plate or any combination thereof, such that the belt is rotated via movement of the protruding element.

Optionally, the frame, the screen, the back plate or any combination thereof, further comprising a slot.

Optionally, the protruding element of the system may be selected from a group consisting of: a pin, a screw, a nail, a flange, a bar, a plate and any combination thereof.

Optionally, the screen of the system may be transparent or semi-transparent.

Optionally, at least one of the at least two wheels of the system may be selected from a group consisting of: a wheel, a disk, a roller, a rod, a bar, a pole, a cylinder or any supporting element enabling rotation or sliding of the belt.

Optionally, the belt of the system further comprising belt-teeth positioned along a the belt, whereby the belt-teeth are evenly spaced.

Optionally, at least one of the at least two wheels of the system may be comprise wheel-teeth, which are evenly spaced. Each wheel-teeth may be designed to fit into a space located between each two belt-teeth, to ensure the position of the belt over the at least two wheels and to enable rotation of the belt over the wheels.

Optionally, the belt of the system further comprising a semi-opaque portion, enabling some of the light to emit therethrough and through the screen.

Optionally, the system further comprising a light guide to evenly disperse the light. The light guide may be positioned in the second space, and may include a first face and a second face, such that the first face of the light guide faces towards the screen and the second face of the light guide faces towards the back plate.

Optionally, the system further comprising a white reflector, positioned in the second space between the second face of the light guide and the belt.

Optionally, the system further comprising a foam pad, positioned in the first space between the back plate and the screen.

Optionally, the image of the system may be transparent or semitransparent.

Optionally, the image of the system may be replaceable.

Optionally, the image of the system may be fastened onto an interior side of the screen or onto an exterior side of the screen.

Optionally, the system further comprising a second image. The second image may be fastened onto an interior side of the screen or onto an exterior side of the screen.

According to an aspect of some embodiments of the present disclosure, there is provided a method for controlling amount of light emitting from a controllable illuminating screen system, the method may include: (i) providing a controllable illuminating screen system, the system including: a frame, including at least one light source, positioned on an interior side of the frame, a screen mounted onto a front side of the frame, a back plate, mounted onto a back side of said frame, the back side positioned opposite the front side, and a belt stretched between at least two wheels, whereby the belt is located inside a first space defined by the frame and located between the back plate and the screen, the belt including a transparent portion and an opaque portion, and a light guide, positioned inside a second space defined by the belt and created by stretching the belt between at least two wheels such that an interior side of the belt rotates around the at least two wheels. Optionally, the at least one light source may illuminates the light guide positioned in the second space, thereby dispersing the light along the surface of the screen (ii) positioning a section of the belt between the light source and the light guide, and (iii) controlling the amount of light emitting through the screen by determining a ratio between the transparent portion and the opaque portion positioned in the section.

Optionally, the positioning further comprising rotating the belt between the at least two wheels.

Optionally, the looped concealing element disclosed in the method further comprising a protruding element protruding from the frame, the screen, the back plate or any combination thereof, such that the belt is rotated via movement of the protruding element.

Optionally, the frame, the screen, the back plate or any combination thereof, may further comprise a slot.

Optionally, the protruding element disclosed in the method may be selected from a group consisting of: a pin, a screw, a nail, a flange, a bar, a plate and any combination thereof.

Optionally, the controllable illuminating screen system includes an image fastened onto a side of the screen, such that light may emit through the screen and the image.

Optionally, the image disclosed in the method may be fastened onto an interior side of the screen or onto an exterior side of the screen.

Optionally, the method further comprising a second image, the second image is fastened onto an interior side of the screen or onto an exterior side of the screen.

Optionally, the image may be a visible representation such as a picture, an engraving, a slide, a clock, any other visual representation or any combination thereof.

According to an aspect of some embodiments of the present disclosure, there is provided a system for controlling amount of light emitting from an illuminating screen, the system may include: a frame defining a space, a screen mounted onto a front side of the frame, a back plate mounted onto a back side of the frame, opposite to the front side, at least one light source positioned within the space defined by the frame, the at least one light source configured to illuminate the screen, and a concealing element located inside the space defined by the frame, the concealing element configured to block light from illuminating the screen. According to some embodiments, the amount of light emitting through the screen may be controlled by a ratio between the area of the concealing element positioned in a section located between the at least one light source and the screen, and the total area of the section.

Optionally, the system further comprising an image, fastened onto a side of the screen, whereby light emits through the screen and the image.

Optionally, the system further comprising a light guide positioned in the space, thereby evenly dispersing the light along the surface of the screen, whereby the at least one light source illuminates the light guide.

Optionally, the image of the system may be a picture, an engraving, a slide, a clock or any combination thereof.

Optionally, the concealing element of the system further comprising a protruding element protruding from the frame, the screen, the back plate or any combination thereof, whereby the concealing elements may be moved via movement of the protruding element.

Optionally, the frame of the system, the screen of the system, the back plate of the system or any combination thereof, further comprising a slot along which the protruding element may move.

Optionally, the protruding element of the system may be selected from a group consisting of: a pin, a screw, a nail, a flange, a bar, a plate, and any combination thereof.

Optionally, the screen of the system may be transparent or semi-transparent.

Optionally, the system further comprising a track, which may support and/or enable movement of the concealing element.

Optionally, the concealing element of the system further comprising a semi-opaque portion, enabling some of the light to emit therethrough.

Optionally, the system further comprising a white reflector, which may be positioned between the at least one light source and the back plate, in the space.

Optionally, the system further comprising a foam pad, which may be positioned between the back plate and the screen, in the space.

Optionally, the image of the system may be transparent or semitransparent.

Optionally, the image of the system may be replaceable.

Optionally, the image of the system may be fastened onto an interior side of the screen or onto an exterior side of the screen.

Optionally, the system further comprising a second image. The second image may be fastened onto an interior side of the screen or onto an exterior side of the screen.

Optionally, the system further comprising more than one concealing element and a connecting element, which may enable the concealing elements to move as one unit.

Optionally, the concealing element of the system further comprising a plurality of concealing elements.

Optionally, the plurality of concealing elements of the system may be connected to each other via a connecting element, to enable simultaneous movement of the plurality of concealing elements.

According to an aspect of some embodiments of the present disclosure, there is provided a method for controlling amount of light emitting from a controllable illuminating screen system, the method may include: (i) providing a controllable illuminating screen system, the system comprising: a frame defining a space, a screen mounted onto a front side of the frame, a back plate mounted onto a back side of the frame, opposite to the front side, at least one light source positioned within the space defined by the frame, the at least one light source configured to illuminate the screen, and a concealing element, located inside the space defined by the frame, the concealing element configured to block light from illuminating the screen, and (ii) controlling the amount of light emitting through the screen by determining a ratio between the area of the concealing element positioned in a section located between the at least one light source and the screen, and the total area of the section.

Optionally, the method further comprising an image, fastened onto a side of the screen, whereby light emits through the screen and the image.

Optionally, the controlling further comprising sliding the concealing element along a track.

Optionally, the controlling further comprising pivoting the concealing element.

Optionally, the method further comprising a protruding element protruding from the frame, the screen, the back plate or any combination thereof, such that the concealing element may be moved via movement of the protruding element.

Optionally, the frame of the method, the screen of the method, the back plate of the method or any combination thereof, further comprising a slot along which the protruding element may move.

Optionally, the protruding element of the method may be selected from a group consisting of: a pin, a screw, a nail, a flange, a bar, a plate and any combination thereof.

Optionally, the image of the method may be fastened onto an interior side of the screen or onto an exterior side of the screen.

Optionally, the method further comprising a second image, whereby the second image is fastened onto an interior side of the screen or onto an exterior side of the screen.

BRIEF DESCRIPTION OF THE DRAWINGS

Some non-limiting exemplary embodiments or features of the disclosed subject matter are illustrated in the following drawings.

In the drawings.

Figure 1:
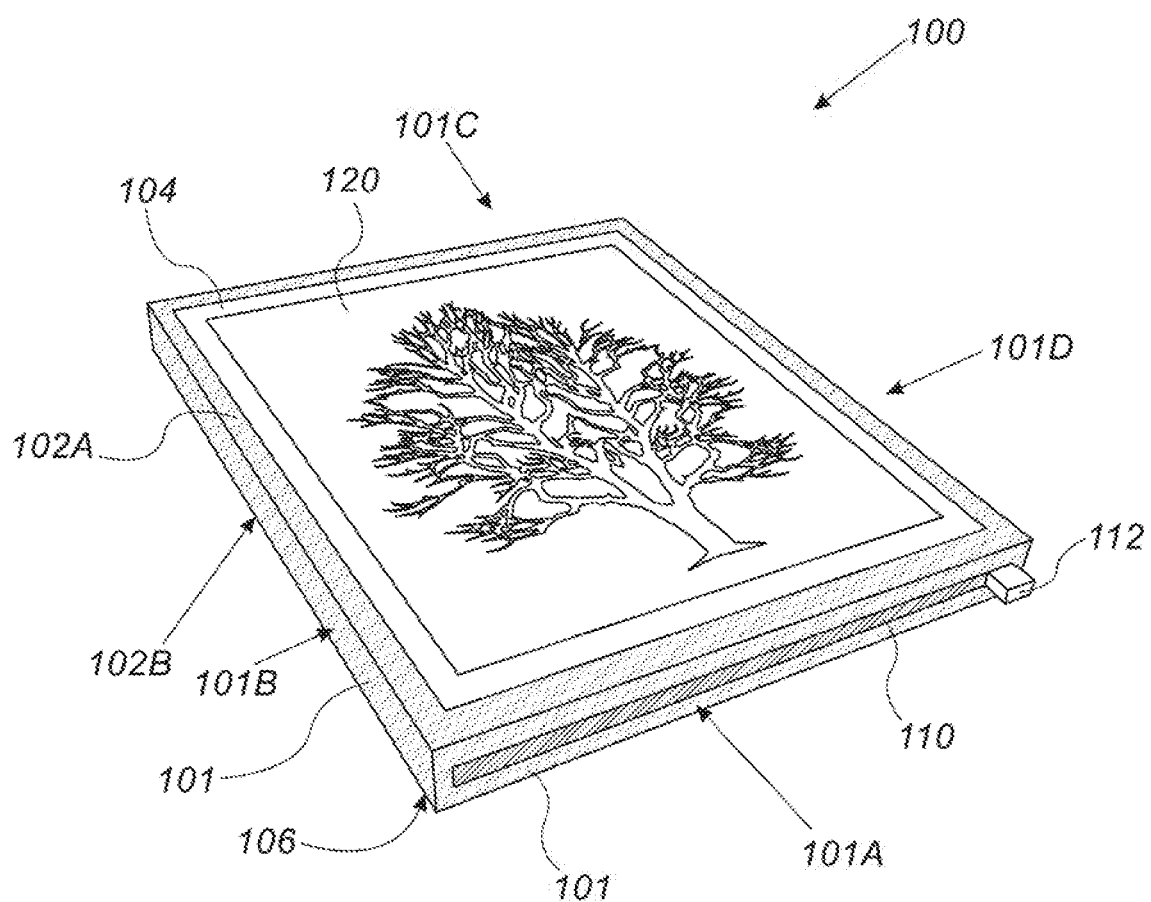
FIG. 1 is a schematic illustration of a front elevation view of a controllable illuminating screen system for controlling amount of light emitting from the illuminating screen, according to an embodiment of the disclosure.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present disclosure provide a user with the ability to control the amount of light emitted from an illuminating screen. As mentioned above, illumining apparatuses may take on many structural forms and/or luminous degrees. However, none of the known illuminating lamps is designed to act as a lighting apparatus in the form of a hanging picture, for example, for decorative or functional reasons such as a picture and/or a clock as well as for illuminating a room, and/or to enable a user to control the amount of light emitted from the apparatus.

According to some embodiments of the disclosure, the illuminating screen may be used as a decorative or a functional, object e.g., illuminating an image for example, a picture or a clock, as well as an illuminating device picture e.g., for illuminating a room. For example, the illuminating screen, which may include a picture or a clock, may be used to illuminate a room during nighttime and/or during bad lighting. Accordingly, the ability to control the amount of light emitted from the illuminating screen, which may include a picture or a clock, may be required by a user. Controlling the amount of light emitted from an illuminating screen, may be applied, for example, by using a looped concealing element. The looped concealing element may be positioned inside a first space of a system for controlling amount of light emitting from an illuminating screen. The first space may be defined, for example, by the frame of the illuminating screen, a screen that may be mounted onto a front side of the frame and/or a back plate, which may be mounted onto a back side of the frame. The screen may comprise an exterior face, which may be used for illuminating an image and/or a room. Whereas the back plate, may be used for hanging the illuminating screen onto a wall. The looped concealing element may be stretched between at least two supporting elements, such as a wheel and/or a cylinder, which may be positioned to support the interior side of the looped concealing element, thereby creating a "loop". By stretching the looped concealing element from the interior side, a second space may be created. The second space may be defined, for example, by the interior side of the looped concealing element and/or the supporting elements. At least one light source may be positioned, for example, to illuminate the second space, i.e., illuminating the interior of the looped concealing element, and/or the supporting elements. The light emitted from the at least one light source, may be designed to emit through the screen, for example, by passing through, a section of the looped concealing element, which may be positioned between the light source and the screen. By emitting light through the screen, the at least one light source may enable the illuminating screen to illuminate a room.

The looped concealing element may comprise at least two portions, for example, a transparent portion and an opaque portion. The light emitted from the at least one light source, may be at least partially blocked before "reaching" the screen, for example, by an opaque portion of the looped concealing element. The looped concealing element may rotate and/or revolve, e.g., rotate around the supporting elements. For example, a user may rotate the looped concealing element, such to position different portions of the looped concealing element as part of a section located between the emitted light and the screen. For example, the user may rotate the looped concealing element to position, the opaque portion, the transparent portion and/or part opaque part transparent portions in the section positioned between the emitted light and the screen. The opaque portion may be used to block light from reaching and/or emitting through the screen, whereas the transparent portion may enable light to emit through the screen of the illuminating screen system.

By rotating the looped concealing element, the user may be able to control the amount of light emitted from the illuminating screen. For example, the user may determine the ratio between the opaque portion and the transparent portion positioned in the section between the screen and the emitted light. Determining the ratio between the opaque portion and the transparent portion may consequently determine an amount of light emitted from the screen, and consequently from the illuminating screen system. For example, a larger opaque portion, compared to the transparent portion, positioned in the section between the at least one light source and the screen, may result in less light illuminated from the illuminating screen system. On the contrary, a larger transparent portion, compared to the opaque portion, positioned in the section between the at least one light source and the screen, may result in more light illuminated from the illuminating screen system. In some embodiments, the looped concealing element may comprise at least one semi-opaque portion, which may enable some of the light to emit through the looped concealing element towards the screen. For example, the semi-opaque portion may enable less light to emit therethrough, towards the screen, compared to the amount of light that is emitted through the transparent portion. And, the semi-opaque portion may enable emission of more light therethrough, compared to the amount of light emitted through the opaque portion (whereby the opaque portion should enable emission of substantially no light therethrough). The use of a looped concealing element comprising a semi-opaque portion, may enable the user to better control the amount of light emitted, for example, by giving the user more control over the ratio between the opaque portion and the transparent portion positioned in the section, and the amount of light that may emit therethrough towards the screen. In some embodiments, a "missing" portion may replace the transparent portion, i.e., a part of the looped concealing element, typically the transparent portion, may be omitted. Omitting the transparent portion from the looped concealing element may enable light to better emit through the screen. Omitting the transparent portion may also be done for financial and/or safety reasons. For example, omitting a portion of the concealing element, e.g., omitting the transparent portion may save money on materials and/or enable a better heat dispersion from inside the illuminating screen system, making the system safer.

In some embodiments, the user may be able to control the rotation of the looped concealing element, either manually or automatically. For example, by using a motor, such as an electrical motor, which may be connected to at least one of the supporting elements, control of rotation of the concealing element may be done automatically. In other cases, the user may manually control the rotation of the looped concealing element, for example, by using a protruding element. The protruding element, may have a first end, which may protrude from the structure of the illuminating screen and may be moved by the user, and a second end, which may be connected to the looped concealing element. By manually moving the first end of the protruding element, the user may move the looped concealing element, which may enable the user to control the amount of light emitted from the illuminating screen.

In some embodiments, an image and/or a slide may be fastened onto the screen, for example, by using glue, nails, clamps, rails and/or any other means enabling fastening an image and/or a slide to a screen. In other embodiments, e.g., when using a slide, there is no need for fastening means but rather the slide may adhere to the screen by nature of the material it is made of and/or by creating vacuum between the slide and the screen. The image and/or slide may be fastened to an exterior side of the screen and/or to an interior side of the screen. The image and/or the slide presented may be replaced, for example, by detaching the image and/or the slide from the screen and fastening a different image and/or slide onto the screen. By being able to fasten and/or detach the images, the user may be able to personalize the illuminating screen according to their desire. In some embodiments, a user may fasten an image and/or a slide to the exterior side of the screen as well as to the interior side of the screen, thereby creating a new image, which may even appear as having depth. It should be noted that the image or any visible representation, may be, for example a picture, an engraving, a clock, any other visual representation of that sort or any combination thereof.

In some embodiments, the image and/or slide may be transparent or semitransparent, enabling light to pass therethrough. Therefore, the illuminating screen may enable a user to illuminate a room, for example, by supplying bright light to illuminate the image and/or slide fastened to the screen and by rotating the looped concealing element such that the transparent portion may be positioned between the at least one light source and the screen. However, by rotating the looped concealing element such that a larger opaque portion compared to the transparent portion, may be positioned between the at least one light source and the screen, may cause less light to be emitted from the illuminating screen system, which may then be used for decoration purposes. Positioning the entire opaque portion between the at least one light source and the illuminating screen may even be used for darkening the room, for example, when using the illuminating screen as a light source for illuminating the room.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Reference is now made to FIG. 1, which is a schematic illustration of a front elevation view of a controllable illuminating screen system for controlling amount of light emitting from the illuminating screen, according to an embodiment of the disclosure. In some embodiments, a controllable illuminating screen system for controlling amount of light emitting from the illuminating screen may be, for example, system 100. In some embodiments, system 100 may comprise a frame, such as frame 101, which may comprise a front side and a back side, e.g. front side 102A may be positioned opposite to back side 102B. In some embodiments frame 101 may comprise one peripheral wall and/or several side walls, e.g., wall 101A, wall 101B, wall 101C and/or wall 101D. System 100 may further comprise a screen, e.g., screen 104, which may be mounted onto front side 102A of frame 101. In some embodiments, for example as illustrated in FIG. 1, an image, such as image 120, may be fastened onto a side of screen 104, for example, onto an exterior and/or an interior side of screen 104. Image 120 may be of the same size as screen 104, therefore, image 120 may fill the entire surface of screen 104. In some embodiments, the size of image 120 may be smaller than the size of screen 104. For example, when image 120 is smaller than screen 104, segments of the screen may be left exposed, which may cause system 100 to illuminate more light. In some embodiments, image 120 may be a visible representation of any kind, for example, image 120 may be a picture, an engraving, a slide, a clock, any other visual representation of that sort or any combination thereof.

In some embodiments, system 100 may comprise a protruding element, which may be connected to a looped concealing element (detailed with respect to FIG. 2 hereinbelow), e.g., protruding element 112, and/or a slot, which may be located along a wall of frame 101, for example, slot 110. Slot 110 may enable protruding element 112 to slide along a wall of frame 101, for example wall 101A. By sliding along wall 101A protruding element 112 may be able to move a looped concealing element, such as looped concealing element 210, as illustrated in FIG. 2 and detailed hereinbelow.

Figure 2:
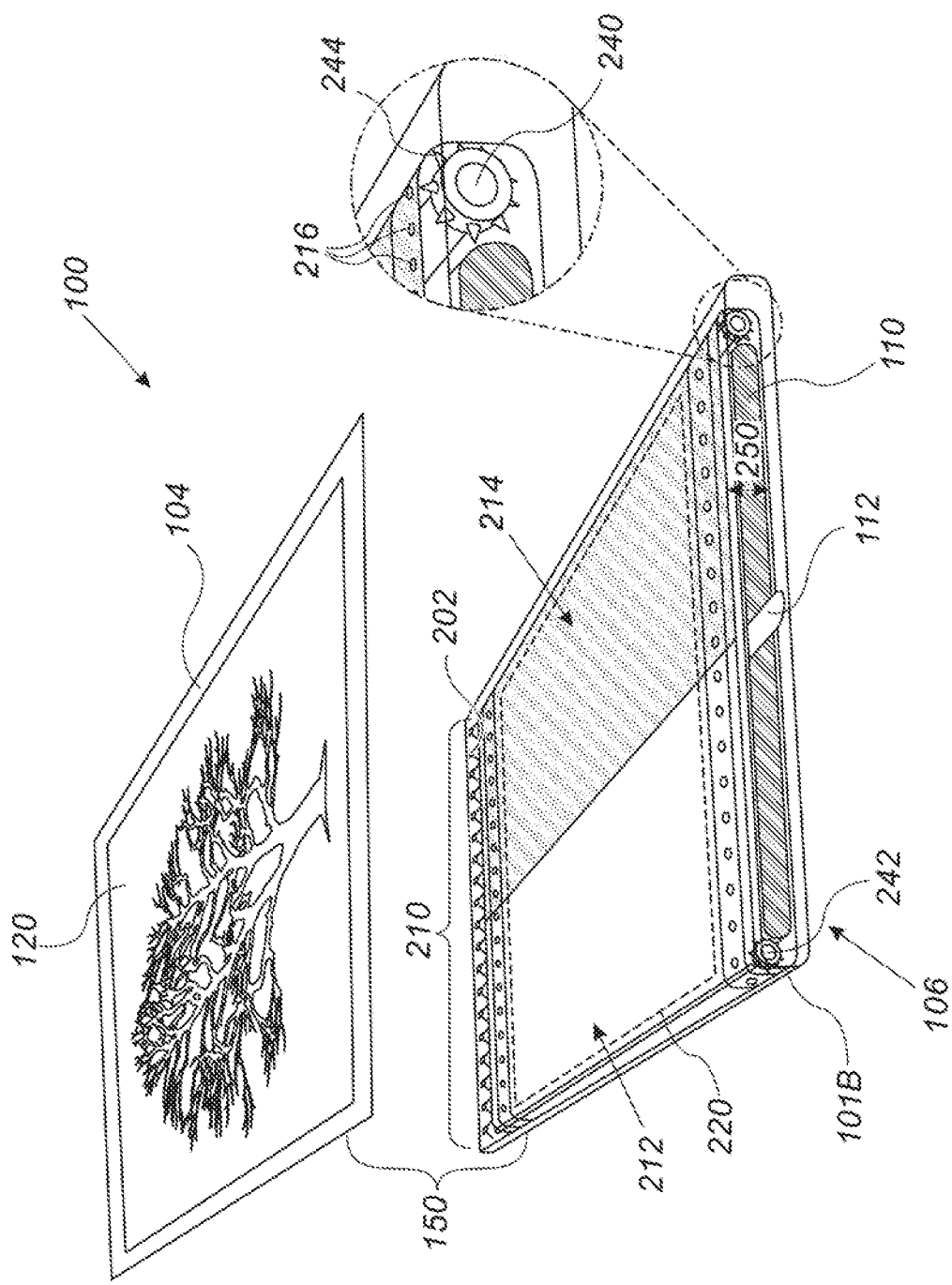
FIG. 2 is a schematic illustration of a front elevation view of a controllable illuminating screen system for controlling amount of light emitting from the illuminating screen when the screen is detached from the frame, according to an embodiment of the disclosure.
Figure 3:
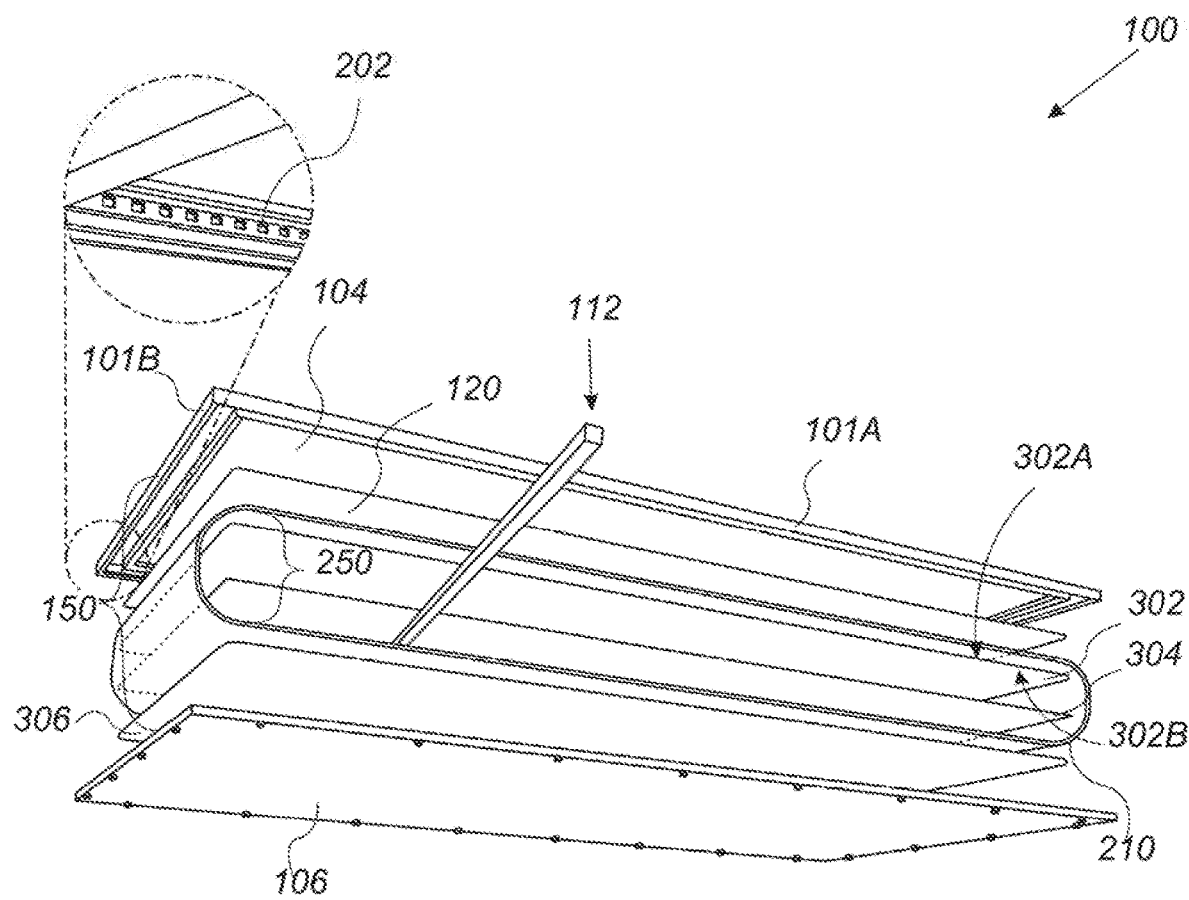
FIG. 3 is a schematic exploded illustration of an elevation side view illustrating some of the elements of a controllable illuminating screen system for controlling amount of light emitting from the illuminating screen, according to an embodiment of the disclosure.

Reference is now made to FIG. 2, which is a schematic illustration of a front elevation view of system 100 for controlling amount of light emitting from an illuminating screen when a screen is detached from the frame, according to an embodiment of the disclosure. In some embodiments, system 100 may comprise looped concealing element 210, which may be located inside a first space, e.g., first space 150, and may be defined as the space between frame 101, screen 104 and back plate 106, as described above. In some embodiments, looped concealing element 210 may comprise at least two portions. For example, a transparent portion, which may also be an "empty space portion", enabling light to pass freely through the transparent portion, and an opaque portion, which may prevent light from passing therethrough. In some embodiments, looped concealing element 210 may comprise a semi-opaque portion, which may enable some of the light to pass through. In some embodiments, looped concealing element 210 may be stretched between at least two supporting elements, for example, supporting elements 240 and 242. Supporting elements 240 and 242, may be located on each end of looped concealing element 210 such that an interior side of looped concealing element 210 may rotate and/or revolve around supporting elements 240 and 242. By being stretched between supporting elements 240 and 242, looped concealing element 210 may define a second space, e.g., second space 250 (as illustrated in FIG. 3), which may be circumscribed by the interior side of looped concealing element 210 and/or supporting elements 240 and 242. In some embodiments, looped concealing element 210 may comprise holes, e.g., holes 216. Holes 216 may be positioned along a peripheral end of looped concealing element 210, and may be evenly spaced, i.e., equal space may be present between each pair of holes 216. Holes 216 may be designed to accommodate spikes, such as spikes 244. Spikes 244 may be positioned on at least one of supporting elements 240 and/or 242 and may be evenly spaced, corresponding to the space between holes 216. By positioning spikes 244 onto at least one of the supporting elements 240 and/or 242, a user may better secure the position of looped concealing element 210 over supporting elements 240 and/or 242 and may also enable easier rotation of concealing element 210 along supporting elements 240 and 242. It should be noted that supporting elements 240 and 242 may be any of: a wheel, a disk, a roller, a rod, a bar, a pole, a cylinder or any supporting element enabling rotation, revolving and/or sliding of looped concealing element 210.

In some embodiments, at least one light source may be positioned on an interior side of frame 101, e.g. light source 202, which may be positioned along wall 101C and/or wall 101A. In some embodiments, there may be a plurality of light sources, such as light source 202, positioned along a wall of frame 101. Light source 202 may be designed to illuminate the second space, e.g., the space created inside of looped concealing element 210, i.e., between the interior side of looped concealing element 210 and/or supporting elements 240 and 242. When light source(s) 202 illuminates the second space, a user may be able to control the amount of light that is being illuminated by system 100. For example, by positioning different portions of looped concealing element 210 between light source 202 and screen 104, the amount of light illuminated by system 100 may be controlled. Since light, which may originate from light source(s) 202, may be emitted through system 100, for example, via screen 104, it may first be required to pass through a section, e.g. section 220 of looped concealing element 210, which may be positioned between light source 202 and screen 104. Therefore, a user may control the amount of light passing through section 220, for example, by determining a ratio between transparent portion 212 and opaque portion 214 positioned in section 220.

In some embodiments, the user may rotate looped concealing element 210, around supporting elements 240 and 242, for example, via a protruding element, e.g., element 112, which may be connected to looped concealing element 210. Protruding element 112 may protrude from frame 101 in various ways, which may depend on the design, structure and/or method of operation of protruding element 112. For example, protruding element 112 may be any of: a pin, a screw, a nail, a flange, a bar, a plate or any combination thereof. Protruding element 112 may protrude out of frame 101, for example, via slot 110. Slot 110 may enable protruding element 112, e.g. a pin, to slide along slot 110. By sliding along slot 110 in one direction, the pin, which may be connected to looped concealing element 210, may respectively, cause looped concealing element 210 to rotate and/or slide around the supporting elements 240 and 242 in the same direction. Rotating and/or sliding looped concealing element 210 around the supporting elements 240 and 242 in a first direction, may assist in changing the ratio between opaque portion 214 and transparent portion 212 in section 220. For example, rotating looped concealing element 210 in the first direction may cause the transparent portion 212 to be larger compared to the opaque portion, thus causing more light to be emitted through system 100. On the contrary, sliding the pin along slot 110 in a second opposite direction may consequently force looped concealing element 210 to rotate and/or slide around the supporting elements 240 and 242 in a direction opposite the first direction, which may also result in change of the ratio between the portions in section 220. For example, the change in ratio when sliding the pin in the second direction may comprise enlarging the opaque portion 214 compared to the transparent portion 212, thus causing less light to be emitted through system 100.

In other embodiments, protruding element 112 may be any of: a rope, a string, a cable, a chain, a cord, a wire, or any combination thereof, which may require that frame 101, screen 104, back plate 106 and/or any combination thereof, may comprise at least one hole and/or a slot to enable protruding element 112 to exit therethrough. Comprising at least one hole and/or a slot, may enable protruding element 112, e.g., a rope, to be connected to looped concealing element 210 in two places. Thus, by pulling and/or rotating the rope in a first direction may consequently force looped concealing element 210 to rotate, revolve and/or slide around the supporting elements 240 and 242 in the same direction. Rotating and/or sliding looped concealing element 210 around the supporting elements 240 and 242 in a first direction may lead to changing the ratio between opaque portion 214 and transparent portion 212 in section 220. For example, rotating looped concealing element 210 in the first direction may cause the transparent portion 212 to be larger compared to the opaque portion, thus causing more light to be emitted through system 100. Whereas, pulling the rope, for example, in a second opposite direction may consequently force looped concealing element 210 to rotate, revolve and/or slide around the supporting elements 240 and 242 in the second direction opposite the first direction, which may also result in change of the ratio between the portions in section 220. For example, the change in ratio caused by rotating looped concealing element 210 in the second direction may comprise enlarging the opaque portion 214 compared to the transparent portion 212, thus causing less light to be emitted through system 100.

In some embodiments supporting elements 240 and 242 may be mounted onto an interior side of at least one wall of frame 101. For example, when supporting elements 240 and 242 are mounted onto a horizontal wall of frame 101, e.g., onto wall 101A and/or wall 101C, looped concealing element 210 may rotate, slide and/or revolve around supporting elements 240 and 242 in a horizontal manner, i.e., from side to side. Alternatively, when supporting elements 240 and 242 are mounted onto a vertical wall of frame 101, e.g., wall 101B and/or wall 101D, looped concealing element 210 may rotate, slide and/or revolve around supporting elements 240 and/or 242 in a vertical manner, i.e., from top to bottom, or vice versa.

Reference is now made to FIG. 3, which is a schematic exploded illustration of a side view illustrating some of the elements of system 100 for controlling amount of light emitting from an illuminating screen, according to an embodiment of the disclosure. In some embodiments, image 120 may be fastened onto the interior side of screen 104, whereas in other embodiments, image 120 may be fastened onto the exterior side of screen 104 (illustrated in FIGS. 1 and 2), or it may be fastened onto both the interior and exterior side of screen 104.

In some embodiments, system 100 may comprise a light guide, e.g., light guide 302, which may be positioned in second space 250. Light guide 302 may comprise a first face and a second face, e.g., first face 302A and second face 302B, such that first face 302A may face towards screen 104 and second face 302B may face towards back plate 106. Light guide 302 may be responsible for even dispersion of the light, which may be generated by light source(s) 202, along the surface of screen 104. By evenly dispersing the light, light guide 302 may enable the illuminating screen, and thus system 100, to illuminate evenly dispersed light, even though light source 202 may be located in one single location, for example, on one of the walls of frame 101. In some embodiments, light source(s) 202 and/or light guide 302 may be positioned on one of the walls of frame 101 between the at least two supporting elements 240 and 242, which may be positioned on opposite ends of a single wall of frame 101. For example, supporting elements 240 and 242 may be mounted onto wall 101A on opposite ends of the wall. Accordingly, light source(s) 202 and/or light guide 302 may be positioned along wall 101A between supporting elements 240 and 242. For example, light source 202 may be positioned along the center of wall 101A and/or along the opposite wall, such as wall 101C.

In some embodiments, a white reflector, such as white reflector 304, may be positioned in second space 250 between second face 302B and looped concealing element 210. White reflector 304 may ensure that most of the light dispersed by light guide 302 may be reflected towards screen 104. By reflecting the dispersed light towards screen 104, white reflector 304 may enable system 100 to illuminate a strong light of high intensity, without the need to use a powerful light source. In some embodiments, system 100 may comprise a foam pad, e.g., foam pad 306. Foam pad 306 may be located in first space 150, at the back of the illuminating screen system 100, for example, between back plate 106 and looped concealing element 210. Foam pad 306 may be made of a soft material, so that it may protect looped concealing element 210 from scratching and/or rubbing against back plate 106, for example, when looped concealing element 210 rotates, slides and/or revolves around supporting elements 240 and 242. In some embodiments system 100, may comprise a light diffuser (not shown), which may be positioned in first space 150 or second space 250, for example, between light guide 302 and screen 104.

Figure 4A:
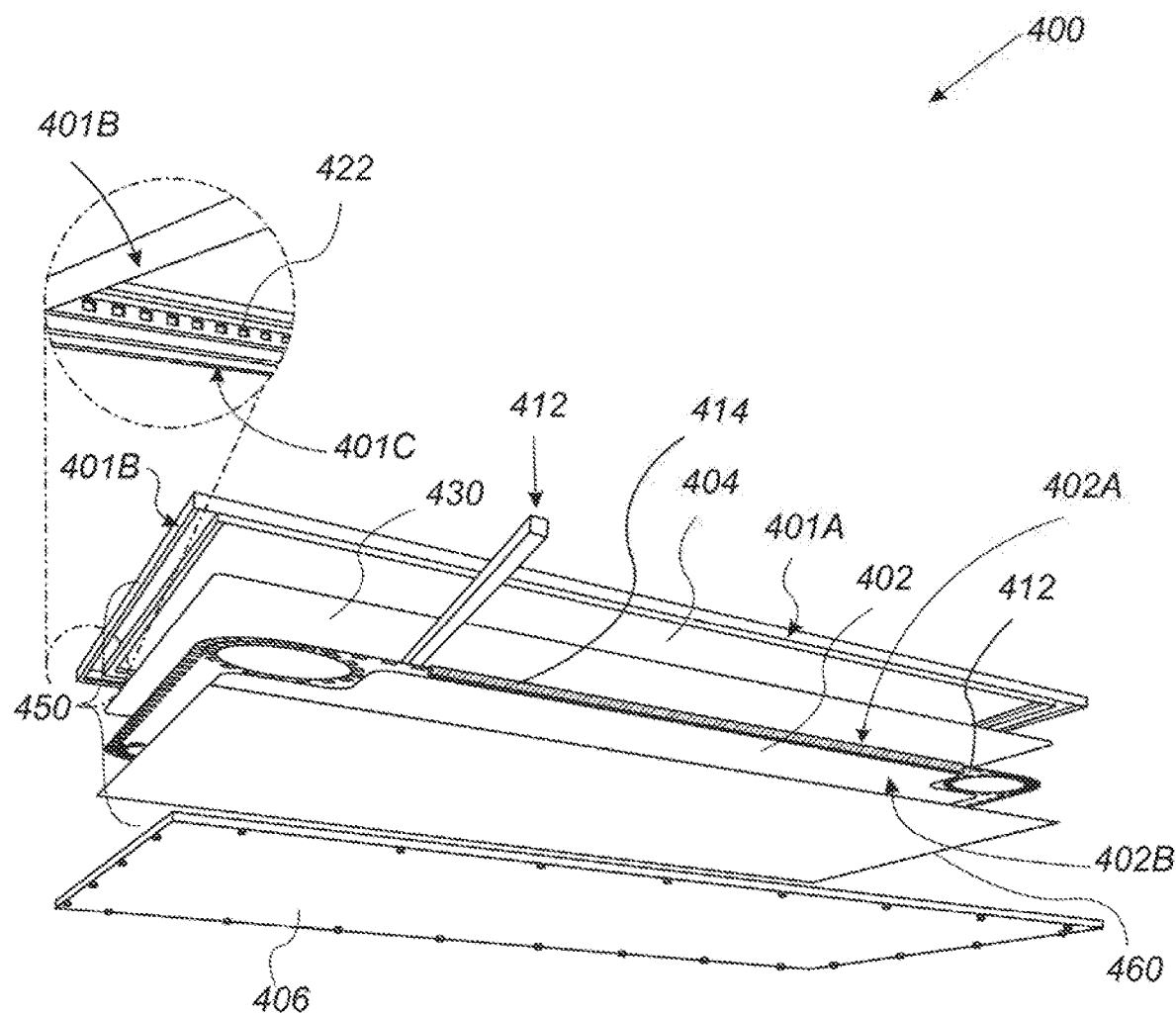
FIG. 4A is a schematic exploded illustration of an elevation side view of a controllable illuminating screen system for controlling amount of light emitting from an illuminating screen, according to another embodiment of the disclosure.
Figure 4B:
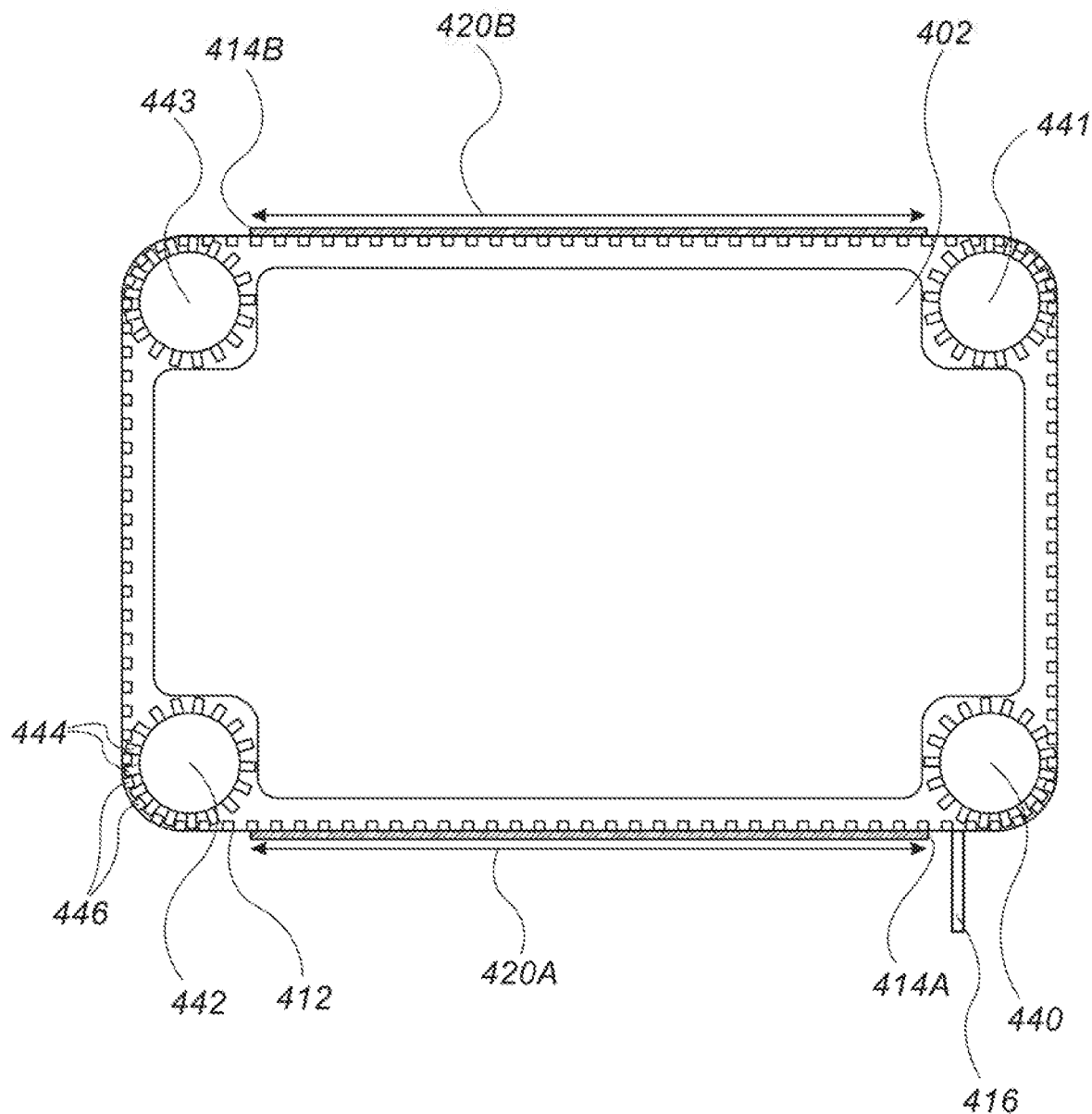
FIG. 4B is a schematic illustration of a top view of some elements of a controllable illuminating screen system for controlling amount of light emitting from the illuminating screen, according to another embodiment of the disclosure.

Reference is now made to FIGS. 4A and 4B, which are schematic illustrations of an exploded view of a controllable illuminating screen system for controlling amount of light emitting from the illuminating screen, and a top view of some elements of the system, respectively, according to another embodiment of the disclosure. In some embodiments, a controllable illuminating screen system for controlling amount of light emitting from the illuminating screen may be, for example, system 400. In some embodiments, system 400 may comprise a frame, such as frame 401, which may comprise a front side and a back side, positioned opposite to each other. In some embodiments, frame 401 may comprise a peripheral wall, or several side walls, e.g., wall 401A, wall 401B, wall 401C and/or wall 401D. System 400 may further comprise a screen, e.g., screen 404, which may be mounted onto a front side of frame 401. In some embodiments, an image, such as image 430, may be fastened onto a side of screen 404, for example, onto an exterior and/or an interior side of screen 404. In some embodiments, image 430 may be of the same size as screen 404, therefore, image 430 may fill the entire surface of screen 404. In other embodiments, the size of image 430 may be smaller than the size of screen 404. For example, when image 430 is smaller than screen 404, segments of the screen may be left exposed, which may cause system 400 to illuminate more light compared to when image 430 covers the entire surface of screen 404. In some embodiments, image 430 may be a visible representation of any kind, for example, image 430 may be a picture, an engraving, a slide, a clock, any other visual representation of that sort or any combination thereof.

In some embodiments, in order to improve light dispersion, for example, inside and/or outside the illuminating screen system, system 400 may comprise a light guide, e.g., light guide 402, which may be surrounded by a conveyor belt, e.g., belt 412. Light guide 402 may comprise a first face and a second face, e.g., first face 402A and second face 402B, such that first face 402A may face towards screen 404 and second face 402B may face towards back plate 406. In some embodiments, back plate 406, may be used for hanging the illuminating screen system 400 onto a wall.

According to some embodiments, light guide 402 may be responsible for even dispersion of the light, which may be generated by the at least one light source, e.g., light source 422, along the surface of screen 404. By evenly dispersing the light, light guide 402 may enable the illuminating screen, and thus system 400, to illuminate evenly dispersed light, regardless of the location of light source 422, which may be located in one single location, for example, on one of the walls of frame 401. Light source 422 may be designed to illuminate light guide 402, e.g., by light source 422 being positioned along an interior side at least one of the walls of frame 401. For example, light source 422 may be positioned along the inner side of wall 401A and/or wall 401C, between wheels 440 and 442. In some embodiments, there may be a plurality of light sources, such as light source(s) 422, positioned along a wall of frame 401, e.g., between wheels 440 and 442. For example, light source(s) 422 may be positioned along the center of wall 401A and/or along the wall opposite wall 401A, e.g., wall 401C.

According to some embodiments, belt 412 may be stretched between at least two wheels, for example, wheels 440 and 442. Wheels 440 and 442 may be located on each end of belt 412 such that an interior side of belt 412 may rotate and/or revolve around wheels 440 and 442. By being stretched between wheels 440 and 442, belt 412 may define a second space, into which light guide 402 may be inserted, e.g., between belt 412 and wheels 440 and 442.

According to some embodiments, belt 412 may comprise at least one opaque portion, e.g., opaque portion 414A and/or opaque portion 414B, and/or at least one transparent portion, which may be an "empty space" portion, which may in fact comprise no material, except for the belt, to enable light to pass freely through the transparent portion. In other embodiments, the transparent portion may comprise a transparent material that enables light to pass therethrough with substantially full transference and almost no absorption by the transparent material. In some embodiments, the transparent portion of belt 412, may be any portion of belt 412 that does not comprise an opaque portion, such as opaque portion 414A and/or opaque portion 414B. That is, any portion of belt 412 that does not comprise an opaque portion, may conform as the transparent portion of belt 412. In some embodiments, belt 412 may comprise a semi-opaque portion, which may enable some of the light to pass therethrough.

In some embodiments, a user may be able to control the amount of light that is being illuminated by system 400. For example, by positioning different portions of belt 412 between light source 422 and light guide 402, the amount of light illuminated by system 400 may be controlled. Light, which may originate from light source(s) 422, may be emitted through system 400, for example, via screen 404, after it is dispersed by light guide 402. That is, the presence of either an opaque portion, a transparent portion or any ratio between these two portions when positioned between light source 422 and light guide 402, may enable a user to control amount of light emitted from the illuminating screen system 400, as will be detailed hereinbelow.

In some embodiments, a white reflector, such as white reflector 460, may be positioned between second face 402B and back plate 406. White reflector 460 may ensure that substantially all of the light dispersed by light guide 402 is reflected towards screen 404. By reflecting the dispersed light towards screen 404, white reflector 460 may enable system 400 to illuminate light of high intensity, without the need to use a powerful light source.

In some embodiments, belt 412 may be stretched between at least two sets of wheels. In some embodiments, system 400 may comprise four wheels, e.g., wheels 440, 441, 442 and 443, such that each of the four wheels may be positioned at what is defined to be one of the four corners that belt 412 rotates around. In some embodiments, belt 412 may be stretched around and rotate or revolve around all four wheels. In some embodiments, the four corners that the wheels are located at may create space into which light guide 402 may be positioned.

In some embodiments, system 400 may comprise a foam pad (not illustrated), such as foam pad 306 illustrated in FIG. 3. The foam pad may be located in the space created between back plate 406 and screen 404. e.g., first space 450, at the back of the illuminating screen system 400, for example, between back plate 406 and white reflector 460. The foam pad may be made of a soft material, so that it may protect white reflector 460 from scratching and/or rubbing against back plate 406.

In some embodiments, in order to control the amount of light dispersed by light guide 402, at least a part of the at least one opaque portion (414A and/or 414B) of belt 412 may be positioned along a section that is located between light source(s) 422 and light guide 402, e.g., section 420A and/or section 420B. Therefore, controlling the amount of light that may reach light guide 402 may be based, for example, on the rotation of belt 412 around the wheels stretching belt 412 (e.g., wheels 440, 441, 442 and 443), such that opaque portion 414A and/or opaque portion 414B may be, at least partially, positioned between light source(s) 422 and light guide 402. Section 420A and/or section 420B may be positioned in front of a portion of belt 412 and/or light guide 402, which may be illuminated by light source(s) 422. In some embodiments system 400, may comprise a light diffuser (not shown), which may be positioned between light guide 402 and screen 404.

Section 420A and/or section 420B, may define an area from which light may be emitted, thus defining the area that may be controlled per amount of light emitted from system 400. Positioning at least a part of the opaque portion of belt 412 along section 420A and/or 420B may block at least some of the light emitted from the at least one light source(s) 422 from reaching light guide 402. That is, by blocking at least some of the light emitted from the at least one light source 422, and not enabling the emitted light to reach light guide 402, the amount of light that may be emitted from the entire system 400 may be controlled. For example, when section 420A (and/or 420B) is at least partially blocked, e.g. via a part of the opaque portion of belt 412 being located between light source(s) 422 and light guide 402, the amount of light emitting from system 400 may be controlled. For example, the more the opaque portion overlaps with section 420A (and/or 420B), the more light is blocked and the less light is emitted from system 400, whereas the more the transparent portion overlaps with section 420A (and/or section 420B), the more light may emit from system 400. Therefore, a user may control the amount of light passing through section 420A and/or 420B, for example, by determining a ratio between the transparent portion and opaque portion 414A and/or 414B that are positioned along section 420A and/or 420B, as detailed above. Thus, controlling the amount of light emitted from illuminating screen system 400, may be accomplished, for example, via rotation of belt 412 around the at least two wheels 440 and 442, or around four wheels 440, 441, 442 and 443.

In some embodiments, wheel 440 and belt 412 may comprise teeth, e.g. teeth 444 and teeth 446, respectively. Each of teeth 444 as well as teeth 446 may be evenly spaced. For example, teeth 446 may be positioned along belt 412, and may be evenly spaced, i.e., equal space may be present between each pair of teeth 446. Teeth 444 may be positioned on wheel 440 and may be evenly spaced, corresponding to teeth 446, such that each of teeth 446 may be positioned at the space created between two of teeth 444. The matching between teeth 446 and the spaces between teeth 444, and vice versa, may assist in securing the position of belt 412 over wheel 440 and may also enable easier rotation of belt 412 along teeth 444 of wheel 440. In some embodiments, any wheel that belt 412 may rotate around may comprise teeth similar to teeth 444, in order to correspond to teeth 446 of belt 412. In some embodiments, wheels 440, 441, 442 and 443 may be any of: a disk, a roller, a rod, a bar, a pole, a cylinder or any element enabling rotation, revolving and/or sliding of wheels 440, 441, 442 and 443 with respect to belt 412.

In some embodiments, a protruding element, e.g., protruding element 416, may be connected to belt 412, and may enable manual rotation of belt 412. For example, by moving protruding element 416, e.g., along frame 401, a user may consequently rotate belt 412 along and/or around wheels 440 and 442 (and/or wheels 441 and 443). In some embodiments, protruding element 416 may protrude from frame 401 in various ways, which may depend on the design, structure and/or method of operation of protruding element 416. For example, protruding element 416 may be any of: a pin, a screw, a nail, a flange, a bar, a plate or any combination thereof. Protruding element 416 may protrude out of frame 401, for example, via a slot (not shown).

Rotating belt 412 along and/or around wheels 440 and 442 (and in some embodiments wheels 441 and 443 as well), e.g., via protruding element 416, may cause a change in the ratio between opaque portion 414A and/or 414B and the transparent portion, which may be positioned along section 420A and/or 420B. For example, rotating belt 412 in a first direction may cause the transparent portion to be larger compared to the opaque portion along section 420A and/or 420B, thus causing more light to be emitted through illuminating screen system 400. On the contrary, sliding protruding element 416 in a second opposite direction may consequently force belt 412 to rotate along and/or around wheels 440 and 442 (and wheels 441 and 443) in a direction opposite the first direction, which may also result in change of the ratio between the portions in section 420A and/or 420B, though a different change in ratio. For example, the change in ratio when moving protruding element 416 in the second direction may comprise enlarging the opaque portion compared to the transparent portion, thus causing less light to be emitted through the illuminating screen system 400.

Figure 5:
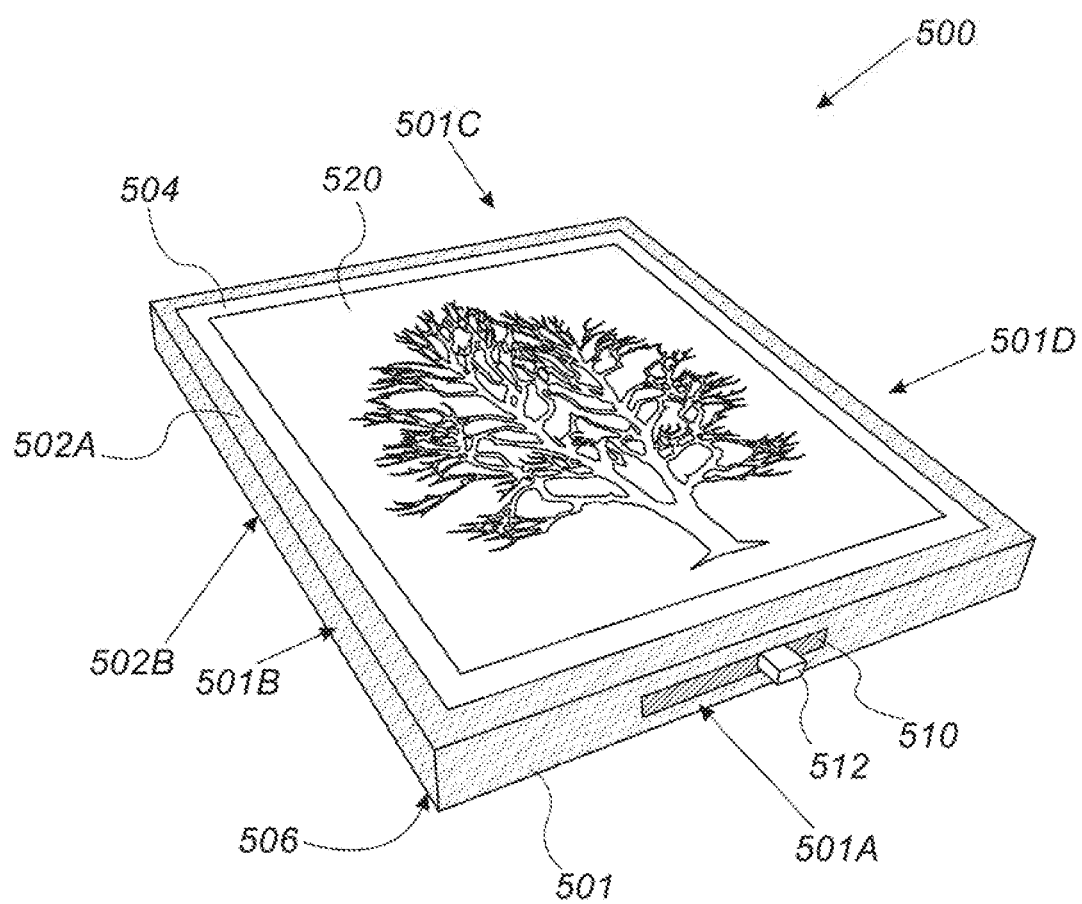
FIG. 5 is a schematic illustration of a front elevation view of a controllable illuminating screen system for controlling amount of light emitting from the illuminating screen, according to yet another embodiment of the disclosure.

Reference is now made to FIG. 5, which is a schematic illustration of a front elevation view of a controllable illuminating screen system for controlling amount of light emitting from the illuminating screen, according to yet another embodiment of the disclosure. In some embodiments, a controllable illuminating screen system for controlling amount of light emitting from the illuminating screen may be, for example, system 500. In some embodiments, system 500 may comprise a frame, such as frame 501, which may comprise a front side and a back side, e.g., front side 502A may be positioned opposite to back side 502B. In some embodiments, frame 501 may comprise one peripheral wall and/or several side walls, e.g., wall 501A, wall 501B, wall 501C and/or wall 501D. System 500 may further comprise a screen, e.g., screen 504, which may be mounted onto front side 502A of frame 501. In some embodiments, an image, such as image 520, may be fastened onto a side of screen 504, for example, onto an exterior and/or an interior side of screen 504. Image 520 may be semi-transparent such to enable light to pass therethrough and be illuminated by a light source positioned within system 500 (e.g., light source 602, FIG. 6). In some embodiments, image 520 may be of the same size as screen 504, therefore, image 520 may fill the entire surface of screen 504. In some embodiments, the size of image 520 may be smaller than the size of screen 504. When image 520 is smaller than screen 504, segments of the screen may be left exposed, which may cause system 500 to illuminate more light compared to when image 520 occupies the entire surface of screen 504. In some embodiments, image 520 may be a visible representation of any kind, for example, image 520 may be a picture, an engraving, a slide, a clock, any other visual representation of that sort, or any combination thereof.

In some embodiments, system 500 may comprise a protruding element, such as protruding element 512. Protruding element 512, may be connected to a connecting element, e.g., connecting element 630 and/or a concealing element, e.g., any of concealing elements 610A-D (detailed with respect to FIG. 6, hereinbelow), and/or a slot, e.g., slot 510, which may be located along a wall of frame 501. Slot 510 may enable protruding element 512 to slide along a wall of frame 501, for example wall 501A. By sliding along wall 501A, protruding element 512 may be able to move connecting element 630 and/or concealing elements 610A-D, as illustrated in FIG. 6 and detailed hereinbelow.

Figure 6:
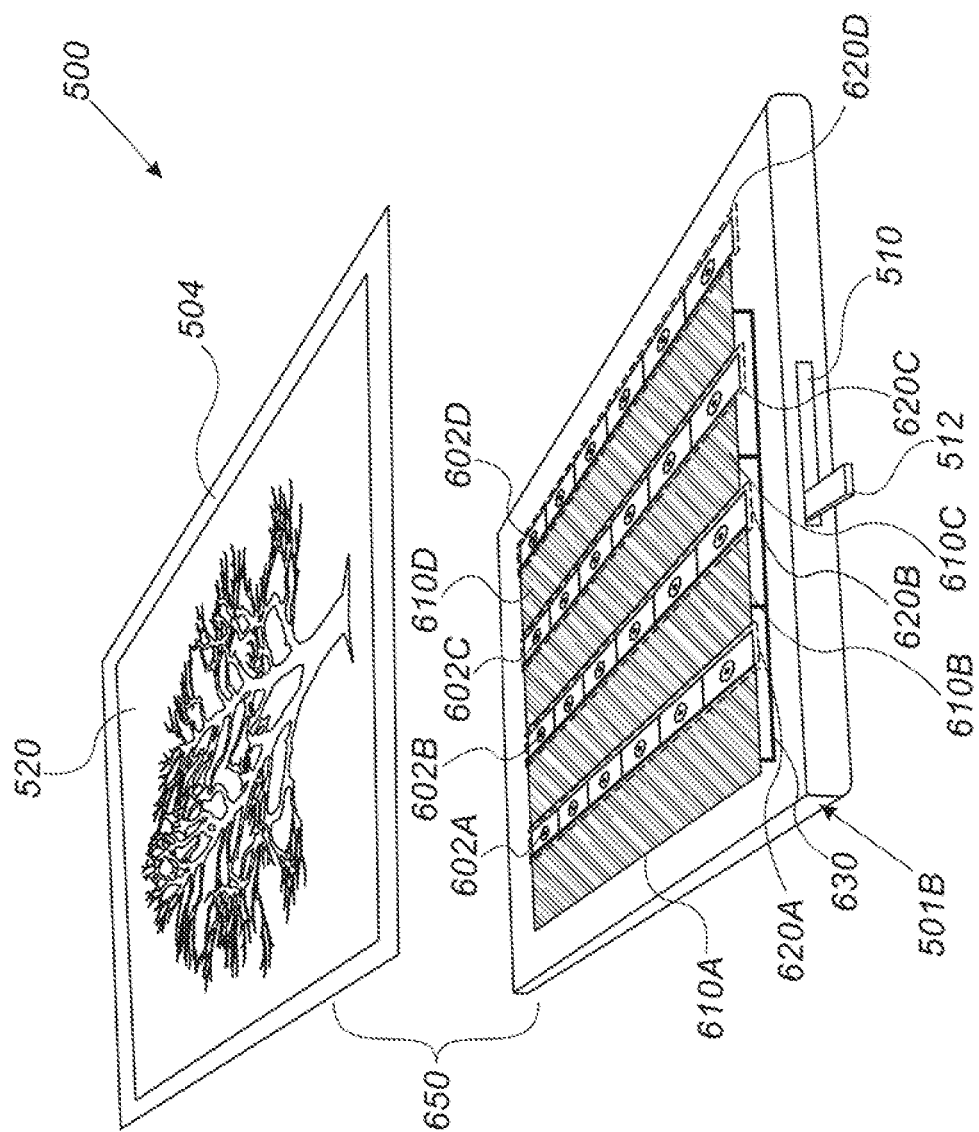
FIG. 6 is a schematic illustration of a front elevation view of a controllable illuminating screen system for controlling amount of light emitting from the illuminating screen when the screen is detached from the frame, according to yet another embodiment of the disclosure.

Reference is now made to FIG. 6, which is a schematic illustration of a front elevation view of system 500 for controlling amount of light emitting from an illuminating screen when a screen is detached from the frame, according to embodiments of the disclosure. In some embodiments, system 500 may comprise a plurality of concealing elements e.g., one or more concealing elements 610A, 610B, 610C, 610D, and so on, which may be located inside a space, e.g., space 650, which may be defined as the space between screen 504 and back plate 506.

In some embodiments, concealing elements 610A-D may be connected to each other, for example, via connecting element 630. Connecting element 630 may enable concealing elements 610A-D to move, e.g., slide, as one unit. For example, connecting element 630 may enable concealing elements 610A-D to move simultaneously. In some embodiments, concealing elements 610A-D may be made of an opaque material, which may prevent light from passing therethrough. In some embodiments, concealing elements 610A-D may be connected to each other, e.g. via connecting element 630, forming a concealing elements assembly. The concealing elements assembly may comprise at least two portions; a concealing element portion and an empty space, i.e., missing portion. The concealing element and the empty space portions may be positioned alternately, such that each empty space portion, i.e., missing portion, may be positioned adjacent to at least one concealing element portion. In some embodiments, an empty space may be positioned adjacent to a concealing element, for example, an empty space may be located between two consecutive concealing elements, such as concealing element 610A and concealing element 610B. Similarly, another empty space may be positioned between concealing element 610B and concealing element 610C, and so on. In some embodiments, a concealing element may be positioned between two empty spaces. For example, when a concealing element is positioned at the end of a concealing elements assembly, such as concealing element 610D, an empty space may be positioned on each side of that concealing element.

In some embodiments, the empty space, i.e., missing portion, may enable light to pass freely therethrough, whereas, the concealing element may prevent light from passing therethrough.

In some embodiments, concealing elements 610A-D may comprise a semi-opaque portion (not shown), which may enable some of the light to pass therethrough. In some embodiments, concealing elements 610A-D may be made of a semi-opaque material.

In some embodiments, concealing elements 610A-D may be positioned between at least two walls of frame 501, such that concealing elements 610A-D may slide along a track positioned along a third wall of frame 501 (not shown). The track may be positioned along at least one of the walls of frame 510, e.g., along wall 501A, and may support movement of concealing elements 610A-D. In some embodiments, an additional track (not shown), may be positioned along an opposite wall of frame 510, e.g., along wall 501C. In such case, the second track may be positioned in parallel to the first track, to enable additional support for concealing elements 610A-D located between the two parallel tracks. It should be noted that the track may be any of: a rail, a slot or any element enabling movement and/or sliding of concealing elements 610A-D.

In some embodiments, system 500 may comprise a single concealing element, which may comprise concealing elements 610A-D connected together as one unit in means other than a connecting element 630. The single concealing element may comprise at least two types of portions; a transparent portion and an opaque portion, which may be positioned alternately. In some embodiments, the transparent portion may be made of a transparent material that may enable passage of light therethrough. In some embodiments, the transparent portion may in fact be a portion of empty space, for enabling light to pass freely through the transparent portion itself. In some embodiments, the opaque portion may be made of opaque material that may prevent light from passing therethrough. The single concealing element may be moved back and forth, for example along a track, as detailed herein above.

In some embodiments, at least one light source may be positioned within space 650, which may be positioned onto back plate 506 or onto any other element of the illuminating system. In some embodiments, there may be a plurality of light sources, such as light source 602A, light source 602B, light source 602C, light source 602D, and so on, positioned within space 650, behind concealing elements 610A-D. For example, light sources 602A-D may be positioned between concealing elements 610A-D, and back plate 506. When light sources 602A-D illuminate the screen 504, a user may be able to control the amount of light that is being illuminated by system 500. For example, the amount of light illuminated by system 500 may be controlled by determining a ratio between the area of concealing elements 610A-D positioned in a section located between light sources 602A-D and screen 504, (e.g., sections 620A, 620B, 620C, 620D and so on) and the total area of sections 620A-D.

In some embodiments, each light source, such as light sources 602A-D, may represent a plurality of light sources, positioned in the same section. In some embodiments, each of light sources 602A-D, may comprise a corresponding section, e.g., one of sections 620A-D. In some embodiments, per each light source, e.g. light sources 602A-D, there may be a corresponding concealing element, e.g., one of concealing elements 610A-D, such that each light source may be covered/blocked by a corresponding concealing element. For example, the plurality of light sources represented by light source 602A may be positioned in section 620A, and may be concealed by corresponding concealing element 610A, and so on. The amount of light emitting through screen 504 may be determined by a ratio between the area per each concealing element positioned in a section of the corresponding light source, and the total area of the section. For example, concealing element 610A may be maneuvered to cover light source 602A via occupying corresponding section 620A. Similarly, concealing element 610B may cover light source 602B along section 620B, and so on.

For convenience reasons only, four concealing elements, such as concealing element 610A-D, and four light sources, such as light sources 602A-D are illustrated. In other embodiments, system 500 may comprise more or less than four concealing elements and/or more or less than four light sources, which may result in system 500 comprising more or less than four corresponding sections, accordingly.

In some embodiments, light, which may originate from light sources 602A-D, may be required to first pass through a section, e.g., any of sections 620A-D, which may be positioned between light sources 602A-D and screen 504, prior to passing through screen 504. Therefore, a user may control the amount of light passing through sections 620A-D, for example, by determining a ratio between the area of concealing elements 610A-D positioned in sections 620A-D, and the total area of sections 620A-D. Sections 620A-D may represent illuminating sections, for example, sections illuminated by light sources 602A-D, which may be required to be blocked, e.g., by concealing elements 610A-D in order to prevent light from illuminating through screen 504. In some embodiments, the size of each section may be determined, for example, by the distance between the light source and its corresponding concealing element and the dispersion angle of the light source.

In some embodiments, the user may simultaneously move, e.g., slide, concealing elements 610A-D, back and forth, for example, via a protruding element, e.g., protruding element 512, which may be connected to connecting element 630 and/or concealing elements 610A-D. Protruding element 512 may protrude from frame 501 in various ways, which may depend on the design, structure and/or method of operation of protruding element 512. For example, protruding element 512 may be any of: a pin, a screw, a nail, a flange, a bar, a plate, or any combination thereof. Protruding element 512 may protrude out of frame 501, for example, via slot 510. Slot 510 may enable protruding element 512, e.g., a pin, to slide along slot 510. By sliding protruding element 512 along slot 510, protruding element 512, which may be connected to connecting element 630 and/or concealing elements 610A-D, may respectively cause concealing elements 610A-D to slide back and forth. Sliding concealing elements 610A-D in a first direction, may assist in changing the ratio between the area of concealing elements 610A-D, positioned in sections 620A-D, and the total area of sections 620A-D. For example, sliding concealing elements 610A-D in the first direction along sections 620A-D, may cause the concealing elements 610A-D to move such to reveal more of the area of sections 620A-D to empty space portions, and cause less area of sections 620A-D to be covered by concealing elements 610A-D, thus causing more light to be emitted through system 500. However, sliding protruding element 512 along slot 510 in a second opposite direction, may consequently force concealing elements 610A-D to simultaneously slide, in a direction opposite the first direction. Sliding concealing elements 610A-D in a direction opposite to the first direction, may also result in change of the ratio between the area of sections 620A-D occupied by concealing elements 610A-D compared to the area of sections 620A-D occupied by the empty spaces. For example, the change in ratio when sliding protruding element 512 in the second direction may comprise enlarging the area of sections 620A-D occupied by concealing elements 610A-D, compared to the area of sections 620A-D occupied by the empty spaces, i.e., missing portions, thus causing less light to be emitted through system 500.

In other embodiments, protruding element 512 may be any of: a rope, a string, a cable, a chain, a cord, a wire, or any combination thereof. Presence of protruding element 512 may require that frame 501, screen 504, back plate 506 and/or any combination thereof, may comprise at least one hole and/or a slot to enable protruding element 512 to exit therethrough, and enable the user to control movement of the protruding element and thus movement of concealing elements 610A-D. Thus, pulling and/or rotating the protruding element 512 in a first direction may consequently force connecting element 630 and thus concealing elements 610A-D to pivot and/or slide, in the same direction. Pivoting and/or sliding concealing element 610A-D (along a track) in a first direction may lead to changing the ratio between the area of concealing elements 610A-D and the area of the empty spaces located at sections 620A-D, with respect to the total area of sections 620A-D.

In some embodiments, connecting element 630 may protrude from frame 501 in various ways, which may depend on the design, structure and/or method of operation of connecting element 630. In some embodiments, for example, when protruding from frame 501, connecting element 630 and protruding element 512 may be the same element.

In some embodiments, the track may be mounted onto and/or carved into, an interior side of at least one wall of frame 501, e.g., wall 501A. In other embodiments, the track may be mounted onto and/or carved into, an interior side of back plate 506 and/or front side 502A and/or back side 502B of frame 501.

Figure 7:
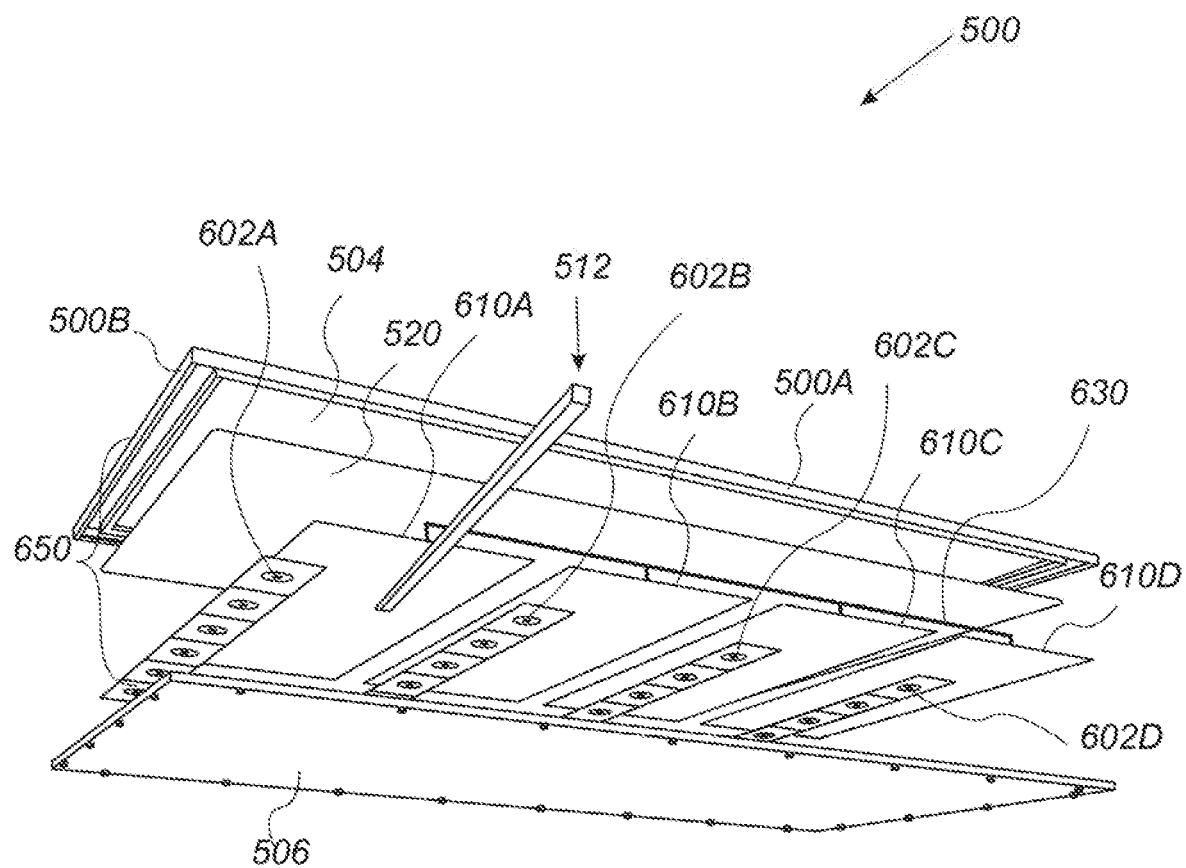
FIG. 7 is a schematic exploded illustration of an elevation side view illustrating some of the elements of a controllable illuminating screen system for controlling amount of light emitting from the illuminating screen, according to yet another embodiment of the disclosure.

Reference is now made to FIG. 7, which is a schematic exploded illustration of a side view illustrating some of the elements of system 500 for controlling amount of light emitting from an illuminating screen, according to embodiments of the disclosure. In some embodiments, image 520 may be fastened onto the interior side of screen 504, whereas in other embodiments, image 520 may be fastened onto the exterior side of screen 504 (illustrated in FIGS. 5 and 6), or it may be fastened onto both the interior and exterior side of screen 504.

In some embodiments, system 500 may comprise a light guide (e.g., light guide 302, FIG. 3) and/or a light diffuser (not shown), which may be positioned in space 650. A light guide may be responsible for even dispersion of the light, which may be generated by light sources 602A-D, along the surface of screen 504. By evenly dispersing the light, the light guide may enable the illuminating screen 504, and thus system 500, to illuminate evenly dispersed light, even though light sources 602A-D may be located in one single location. In some embodiments, a light diffuser, may be responsible for moderating the light, which may result in system 500 illuminating "soft light".

In some embodiments, a white reflector (not shown), such as white reflector 304 (FIG. 3), may be positioned in space 650 between light sources 602A-D and back plate 506. The white reflector may ensure that most of the light illuminated by light sources 602A-D and/or dispersed by the light guide and/or the light diffuser may be reflected towards screen 504. By reflecting the light towards screen 504, the white reflector may enable system 500 to illuminate a strong light of high intensity, without the need to use a powerful light source. In some embodiments, system 500 may comprise a foam pad (not shown), such as foam pad 306 (FIG. 3). The foam pad may be located in space 650, at the back of the illuminating screen system, for example, between back plate 506 and light sources 602A-D. The foam pad may be made of a soft material, so that it may protect moving elements in system 500 from scratching and/or rubbing against back plate 506.

In some embodiments concealing elements 610A-D may be positioned in sections 620A-D, for example, in parallel to screen 504, such to block light, emitting from light sources 602A-D, to emit from illuminating system 500 via screen 504. A user may change the angle in which concealing elements 610A-D may be positioned, for example, by pivoting protruding element 512, which may cause concealing elements 610A-D. e.g., via connecting element 630, to pivot accordingly. For example, a user may change the angle at which concealing elements 610A-D are positioned with respect to screen 504. For example, a user may change the positioning angle of concealing elements 610A-D in 90 degrees, e.g., from being positioned in parallel to screen 504 to being positioned perpendicularly to screen 504. By controlling the positioning angle of concealing elements 610A-D, a user may control the size of area that concealing elements 610A-D occupy with respect to the area of sections 620A-D. That is, a user may control the ratio between the area of concealing elements 610A-D and the area of the empty spaces, which occupy corresponding sections 620A-D, with respect to the total area of sections 620A-D. For example, when concealing elements 610A-D are positioned in parallel to screen 504, the concealing elements 610A-D may occupy the majority of the total area of sections 620A-D, thereby preventing light from emitting via illuminating system 500. Whereas, when concealing elements 610A-D are positioned perpendicularly to screen 504, the empty spaces may occupy the majority of the total area of sections 620A-D, thus enabling substantially complete light passage through illuminating system 500. Any positioning angle in between the parallel and the perpendicular positions of concealing elements 610A-D with respect to screen 504, may enable partial illumination through screen 504.

Figure 8:
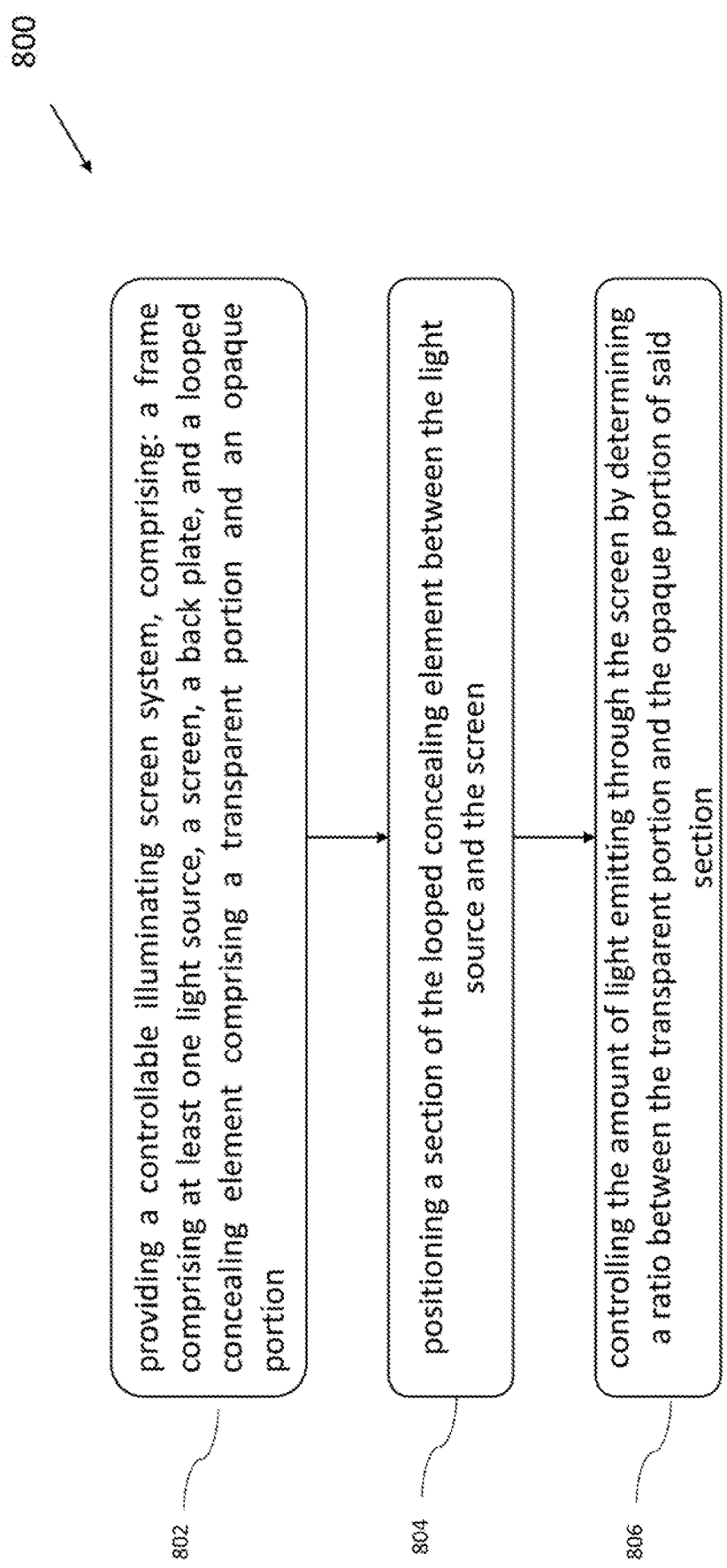
FIG. 8 is a schematic flowchart illustrating a method for controlling amount of light emitting from an illuminating screen system, according to some embodiments of the present disclosure.

Reference is now made to FIG. 8, which is a schematic flowchart illustrating a method for controlling amount of light emitting from an illuminating screen, according to some embodiments of the present disclosure. In some embodiments, a method for controlling amount of light emitting from an illuminating screen may be, for example, method 800. As indicated in operation 802, a controllable illuminating screen system may be provided. In some embodiments, the illuminating screen system for controlling amount of light emitting from the illuminating screen, may be, for example, system 100, as detailed above with respect to FIGS. 1-3. The illuminating screen system may comprise a frame, e.g. frame 101, which may comprise a front side and a back side, e.g., front side 102A and back side 102B, which may be positioned on opposite ends of frame 101. In some embodiments, frame 101 may comprise one peripheral wall and/or several side walls, e.g., wall 101A, wall 101B, wall 101C and/or wall 101D. The system may further comprise a screen, e.g., screen 104, which may be mounted onto front side 102A of frame 101. In some embodiments, an image, such as image 120, may be fastened onto a side of screen 104, for example, onto an exterior and/or an interior side of screen 104. It should be noted that the image or any visible representation such as image 120, may be, for example a picture, an engraving, a clock, any other visual representation of that sort or any combination thereof. Image 120 may be of a size similar to the size of screen 104, thereby occupying substantially the entire surface of screen 104. Alternatively, image 120 may be smaller than the size of screen 104. When image 120 is smaller than screen 104, segments of the screen may be left exposed, which may cause system 100 to illuminate more light compared to when image 120 occupies the entire surface of screen 104. As further indicated in operation 802, the system may comprise a looped concealing element, e.g., looped concealing element 210, which may comprise an opaque portion and a transparent portion. Looped concealing element 210 may be connected to a protruding element, e.g., protruding element 112, which may enable control of rotation of the looped concealing element 210.

In some embodiments, as indicated in operation 804 of method 800, a user may position a section of looped concealing element 210, e.g. section 220, between light source(s) 202 and/or light guide 302 and screen 104. As indicated in operation 506 of method 800, a user may control the amount of light emitting through the screen, for example, by determining a ratio between transparent portion 212 and opaque portion 214 positioned in section 220. That is, according to the ratio between the transparent section 212 with respect to the opaque portion 214 along section 220, a user may control the amount of light emitting through section 220 and thus through the entire illuminating screen system, e.g., system 100. If section 220 comprises a larger transparent portion 212 compared to the opaque portion 214, more light is permitted to emit through system 100, as opposed to if the opaque portion 214 is larger compared to transparent portion 212, which is when less light emits through system 100, since more light is blocked by opaque portion 214. A user may rotate looped concealing element 210 such to control the ratio between the transparent portion 212 and the opaque portion 214, and thus to control amount of light that may emit through system 100 via section 220.

Figure 9:
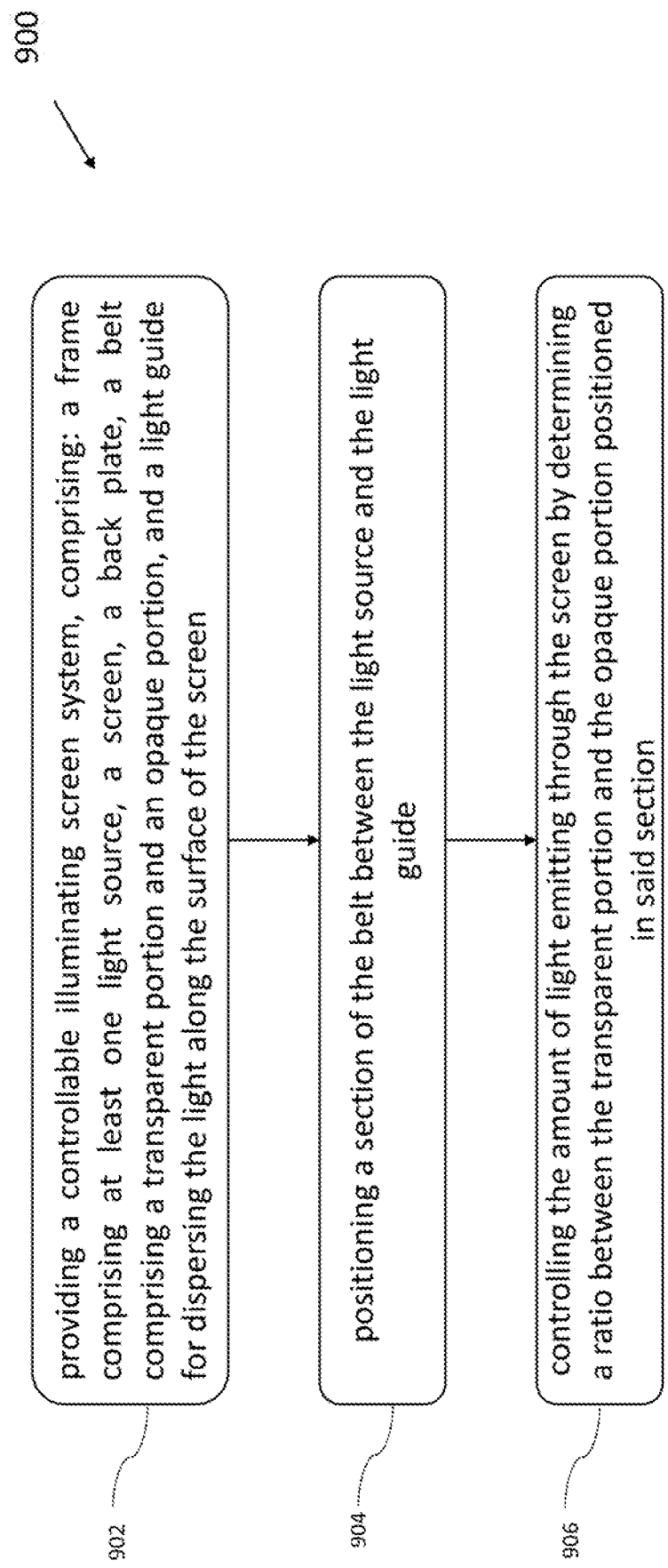
FIG. 9 is a schematic flowchart illustrating a method for controlling amount of light emitting from an illuminating screen system, according to some embodiments of the present disclosure.

Reference is now made to FIG. 9, which is a schematic flowchart illustrating a method for controlling amount of light emitting from an illuminating screen, according to another embodiment of the present disclosure. In some embodiments, a method for controlling amount of light emitting from an illuminating screen may be, for example, method 900. As indicated in operation 902, a controllable illumination screen system may be provided. In some embodiments, the illuminating screen system for controlling amount of light emitting from the illuminating screen, may be, for example, system 400, as detailed hereinabove with respect to FIGS. 4A-4B. The illuminating screen system may comprise a frame, e.g., frame 401, which may comprise a front side and a back side, which may be positioned on opposite ends of frame 401. In some embodiments, frame 401 may comprise a peripheral wall, which may comprise several side walls, e.g., wall 401A, wall 401B, wall 401C and/or wall 401D. The system may further comprise a screen, e.g., screen 404, which may be mounted onto front side of frame 401. In some embodiments, an image, such as image 430, may be fastened onto a side of screen 404, for example, onto an exterior and/or an interior side of screen 404. It should be noted that the image or any visible representation such as image 430, may be, for example a picture, an engraving, a clock, any other visual representation of that sort or any combination thereof. Image 430 may be of a size similar to the size of screen 404, thereby occupying substantially the entire surface of screen 404. Alternatively, image 430 may be smaller than the size of screen 404. When image 430 is smaller than screen 404, segments of the screen may be left exposed, which may cause system 400 to illuminate more light compared to when image 430 occupies the entire surface of screen 404. As indicated in operation 902, the system may further comprise a conveying belt, e.g., belt 412, which may comprise an opaque portion and a transparent portion. Belt 412 may be connected to a protruding element, e.g., protruding element 416, which may control rotation of belt 412.

In some embodiments, as indicated in operation 904 of method 900, a user may position a part of belt 412 along a section, which may be positioned between light source(s) 422 and/or light guide 402, e.g. section 420A and/or section 420B. As indicated in operation 906 of method 900, a user may control the amount of light emitting through the screen, for example, by determining a ratio between the transparent portion and opaque portion 414A and/or 414B of belt 412, which may be positioned along section 420A and/or 420B, respectively. That is, according to the ratio between the transparent portion and the opaque portion positioned along section 420A and/or 420B, a user may control the amount of light emitting through section 420A and/or 420B, (after being dispersed by light guide 402) and may thus control amount of light emitting through the entire illuminating screen system, e.g., system 400. If the part of belt 412 that is positioned along section 420A and/or 420B comprises a larger transparent portion compared to the size of the opaque portion, more light may be permitted to be evenly dispersed, e.g., by light guide 402, and may therefore be emitted through system 400. However, if the part of belt 412 that is positioned along section 420A and/or 420B comprises a larger opaque portion compared to the size of the transparent portion, less light may emit through system 400, since more light may be blocked by the larger opaque portion. A user may rotate belt 412 such to control the ratio between the transparent portion and the opaque portion positioned along section 420A and/or 420B, and thus control amount of light that may emit via section 420A and/or section 420B and be dispersed, for example, by light guide 402, thereafter being emitted through system 400.

Figure 10:
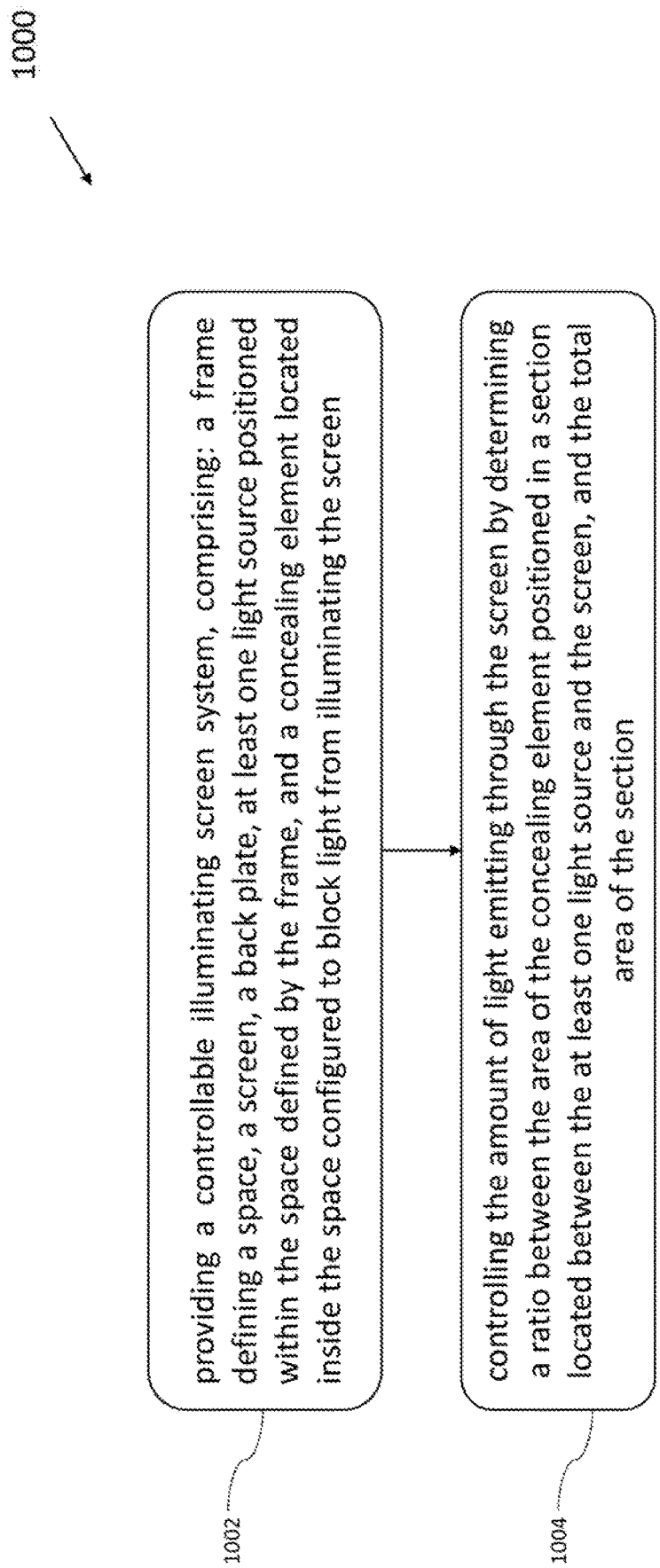
FIG. 10 is a schematic flowchart illustrating a method for controlling amount of light emitting from an illuminating screen system, according to some embodiments of the present disclosure.

Reference is now made to FIG. 10, which is a schematic flowchart illustrating a method for controlling amount of light emitting from an illuminating screen, according to some embodiments of the present disclosure. In some embodiments, a method for controlling amount of light emitting from an illuminating screen may be, for example, method 1000. As indicated in operation 1002, a controllable illuminating screen system may be provided. In some embodiments, the illuminating screen system for controlling amount of light emitting from the illuminating screen, may be, for example, system 500, as detailed above with respect to FIGS. 5-7. The illuminating screen system may comprise a frame, e.g. frame 501, which may comprise a front side and a back side, e.g., front side 502A and back side 502B, which may be positioned on opposite ends of frame 501. In some embodiments, frame 501 may comprise one peripheral wall and/or several side walls, e.g., wall 501A, wall 501B, wall 501C and/or wall 501D, and may define a space, e.g., space 650. The system may further comprise a screen, e.g., screen 504, which may be mounted onto front side 502A of frame 501. In some embodiments, an image, such as image 520, may be fastened onto a side of screen 504, for example, onto an exterior and/or an interior side of screen 504. It should be noted that the image or any visible representation such as image 520, may be, for example a picture, an engraving, a clock, any other visual representation of that sort or any combination thereof. Image 520 may be of a size similar to the size of screen 504, thereby occupying substantially the entire surface of screen 504. Alternatively, image 520 may be smaller than the size of screen 504. When image 520 is smaller than screen 504, segments of the screen may be left exposed, which may cause system 500 to illuminate more light compared to when image 520 occupies the entire surface of screen 504. As further indicated in operation 1002, the system may comprise a concealing element, e.g., concealing elements 610A-D, which may be made of an opaque material. Concealing elements 610A-D may be connected to a protruding element, e.g., protruding element 512, which may enable control of movement of concealing elements 610A-D. Concealing elements 610A-D may additionally be connected to each other, e.g., by connecting element 630, which may enable simultaneous movement of concealing elements 610A-D, for example as one unit.

In some embodiments, as indicated in operation 1004 of method 1000, a user may control the amount of light emitting through the screen, for example, by determining a ratio between the area of concealing elements 610A-D positioned in sections 620A-D, and the total area of sections 620A-D. That is, according to the ratio between the area of concealing elements 610A-D compared to the area of the empty spaces, i.e., missing portions, with respect to the total area of sections 620A-D, a user may control the amount of light emitting through sections 620A-D and thus through the entire illuminating screen system, e.g., system 500. If the area of each of sections 620A-D comprises a larger area of empty spaces, compared to the size of area of concealing elements 610A-D, with respect to the total area of sections 620A-D, more light is permitted to emit through system 500. On the contrary, if the area of concealing elements 610A-D is larger compared to the area of the empty spaces, with respect to the total area of sections 620A-D, less light may emit through system 500, since more light is blocked by concealing elements 610A-D. A user may move concealing elements 610A-D such to control the ratio between the area of the empty spaces and the area of concealing elements 610A-D positioned in sections 620A-D, and thus to control amount of light that may emit through system 500 via screen 504.

It should be noted that an illuminating screen system for controlling amount of light emitting from an illuminating screen, according to embodiments of the present disclosure, may comprise a combination of elements as implemented in any of the systems described hereinabove. That is, elements from system 100 may be implemented as part of systems 400 and 500, elements from system 400 may be implemented as part of systems 100 and 500, and elements from system 500 may be implemented as part of systems 100 and 400.

Conjugated terms such as, by way of example, 'a thing property' implies a property of the thing, unless otherwise clearly evident from the context thereof.

In case electrical or electronic equipment is disclosed it is assumed that an appropriate power supply is used for the operation thereof.

The flowchart and block diagrams illustrate architecture, functionality or an operation of possible implementations of systems, and methods according to various embodiments of the present disclosed subject matter. It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

What is claimed is:

1. A controllable illuminating screen system for controlling amount of light emitting from the illuminating screen system, said system comprising:
   a frame, defining a space;
   a screen, mounted onto a front side of said frame;
   a back plate, mounted onto a back side of said frame, opposite said front side;
   at least one light source positioned within the space defined by the frame, said at least one light source configured to illuminate the screen; and
   a concealing element located inside the space defined by the frame, said concealing element configured to block light from illuminating the screen;
   wherein the amount of light emitting through the screen is controlled by a ratio between the area of the concealing element positioned in a section located between the at least one light source and the screen, and the total area of said section.

2. The system of claim 1, further comprising an image, fastened onto a side of the screen, wherein light emits through said screen and said image.

3. The system of claim 2, wherein said image is a picture, an engraving, a slide, a clock or any combination thereof.

4. The system of claim 1, wherein said concealing element further comprises a protruding element protruding from the frame, the screen, the back plate or any combination thereof, wherein said concealing elements is moved via movement of said protruding element.

5. The system of claim 4, wherein the frame, the screen, the back plate or any combination thereof, further comprise a slot along which the protruding element moves.

6. The system of claim 4, wherein said protruding element is selected from a group consisting of: a pin, a screw, a nail, a flange, a bar, a plate, and any combination thereof.

7. The system of claim 1, wherein the screen is transparent or semi-transparent.

8. The system of claim 1, wherein the concealing element further comprises a semi-opaque portion, enabling some of the light to emit therethrough.

9. The system of claim 2, wherein said image is transparent or semitransparent.

10. The system of claim 2, wherein said image is replaceable.

11. The system of claim 2, wherein said image is fastened onto an interior side of the screen or onto an exterior side of the screen.

12. The system of claim 2, further comprising a second image, wherein said second image is fastened onto an interior side of the screen or onto an exterior side of the screen.

13. The system of claim 1, wherein said concealing element comprises a plurality of concealing elements.

14. The system of claim 13, wherein said plurality of concealing elements are connected to each other via a connecting element, to enable simultaneous movement of the plurality of concealing elements.

15. A method for controlling amount of light emitting from a controllable illuminating screen system, said method comprising:
  providing a controllable illuminating screen system, said system comprising:
   a frame, defining a space;
   a screen, mounted onto a front side of said frame;
   a back plate, mounted onto a back side of said frame, opposite said front side;
   at least one light source, positioned within the space defined by the frame, said at least one light source configured to illuminate the screen; and
   a concealing element, located inside the space defined by the frame, said concealing element configured to block light from illuminating the screen; and
  controlling the amount of light emitting through the screen by determining a ratio between the area of the concealing element positioned in a section located between the at least one light source and the screen, and the total area of said section.

16. The method of claim 15, further comprising an image, fastened onto a side of the screen, wherein light emits through said screen and said image.

17. The method of claim 15, further comprising a protruding element protruding from the frame, the screen, the back plate or any combination thereof, such that said concealing element is moved via movement of said protruding element.

18. The method of claim 17, wherein said protruding element is selected from a group consisting of: a pin, a screw, a nail, a flange, a bar, a plate and any combination thereof.

19. The method of claim 16, wherein said image is fastened onto an interior side of the screen or onto an exterior side of the screen.

20. The method of claim 16, further comprising a second image, wherein said second image is fastened onto an interior side of the screen or onto an exterior side of the screen.

\* \* \* \* \*